Patented Mar. 15, 1949

2,464,284

UNITED STATES PATENT OFFICE 2,464,284

VASOCONSTRICTOR COMPOSITION

Gordon A. Alles, San Marino, Calif., assignor to Smith, Kline & French Laboratories, Philadelphia, Pa., a corporation of Pennsylvania No Drawing. Application October 18, 1943, Serial No. 506,754

12 Claims. (Cl. 167—65)

This invention relates to a medical preparation, and particularly to a medical preparation suitable for topical application to the mucosa to effect vasoconstriction.

The principal object of this invention is to provide a new and advantageous medical preparation suitable for such application.

This application is a continuation-in-part of my applications Ser. Nos. 461,451 and 461,452, filed October 9, 1942, both now abandoned.

The new medical preparation in accordance with this invention is useful for effecting vasoconstriction in the mucosal membranes of the body and results therefrom. In accordance with this invention a novel and effective remedy is provided for use in the treatment of congestions of the nasal or bronchial airway and its connecting sinuses, such as occur with colds, sinusitis, hay fever, bronchial asthma and similar inflammatory conditions. It is also notably effective when applied to the conjunctiva of the eye. The remedy acts to cause constriction of the smaller blood vessels of the mucosa with consequent shrinkage of the tissue and drainage of edema fluid.

An important novel and advantageous characteristic of the medical preparation in accordance with this invention is the selectivity of its production of vasoconstrictor effect in the mucous membranes of the body. Thus, when topically applied in suitably compounded solutions there results little or no sensory irritant effect though the vasoconstrictor effect is marked and prolonged even with quite low concentrations of the active ingredient. Further, the amounts that may be systemically absorbed from the topical application of concentrations and volume amounts sufficient to produce marked vasconstrictor effect in the mucosal membranes do not produce any notable effect upon the central nervous system. The complete systemic absorption of very considerable amounts of the active ingredient has only moderate effects upon the general circulation of the body. By reason of these novel characteristics this medical preparation is particularly useful in local treatment of the nasal or bronchial mucosa and when locally applied to the eye exerts notable vasoconstrictor action.

The new medical preparation in accordance with this invention comprises a bland solution compatible with the mucous membrane and containing as an effective ingredient a salt of an α-methylhexylamine selected from the group consisting of α-methyl-normal-hexylamine.

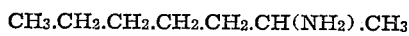

and α-methyl-iso-hexylamine,

more particularly, such a medical preparation contains from 0.01 to 0.3 gram-equivalent per liter of a salt of the α-methylhexylamine, such as the chloride, sulfate, tartrate, or oleate, in solution in a liquid suitable for application to the mucosal membranes such as a neutral or weakly acidic aqueous liquid or oil. These salts may be used in either their optically active or racemic forms.

Following the observations of others, I have found that while a number of primary-carbin alkylamines do have some vasoconstrictor effect, this action is of short duration and no considerable and prolonged vasoconstriction results from various modes of application. While some observations have been made by others of the effect of a few secondary-carbin alkylamines after intravenous injection into animals, none of these were found to exert sufficiently notable and prolonged vasoconstrictor effect to be suitable for a medical preparation. I have discovered that α-methyl-normal-hexylamine and α-methyl-isohexylamine are far more active than any secondary-carbin alkylamines previously studied by others and that these α-methylhexylamines are advantageously suitable for medical preparations when used in compounded solutions of proper concentration range. Solutions of such an α-methylhexylamine when topically applied to mucosal membranes, such as the nasal membranes or the surface of the eye, cause prolonged vasoconstriction and this action extends deeply into the tissues for the effective ingredient is absorbed without considerable destruction.

While for topical application a solution of a salt of α-methyl-normal-hexylamine or of α-methylisohexylamine containing but 0.01 gram-equivalent per liter causes a considerable vasoconstriction, higher concentrations with their greater and more prolonged effects are more generally suitable.

A suitable vasoconstrictor composition in accordance with this invention may comprise a bland aqueous or oil solution compatible with the mucuous membrane, containing a salt of the α-methylhexylamine dissolved in a many-fold greater amount of an aqueous solvent or oil.

Such a composition in the form of an aqueous solution may be prepared by dissolving the amine salt in a many-fold greater amount of a bland aqueous vehicle compatible with the mucous membrane. Preferred examples of aqueous vehicles that may be employed are aqueous solutions containing suitable concentrations of solutes having therapeutic properties and compatible with the functioning of the mucous membrane, such as boric acid or sodium chloride.

For example, I have found that a bland aqueous solution containing 1 or 2 grams of the sulfate of such an α-methylhexylamine in 100 milliliters of saturated boric acid solution in water, is most generally suitable. These concentrations correspond to 0.06 and 0.12 gram-equivalent per liter, respectively, and comparable concentrations of other α-methylhexylamine salts may be equivalently employed. For a particularly intense shinkage an aqueous solution containing as much as 0.3 gram-equivalent of the salt per liter, though hypertonic in ionic strength, may be desirably used without any considerable irritant effect. Solutions in aqueous liquids containing less than 0.15 gram-equivalent per liter of the effective ingredient are desirably brought up to such ionic strength by the addition of sodium chloride or any physiologically compatible mixture of salts.

Oil solutions are on occasion suitable for application in the nose, such as a preparation containing an α-methylhexylamine oleate dissolved in a many-fold greater amount of a bland oil vehicle compatible with the mucous membrane. A generally suitable medical preparation of this type is made by dissolving 1 gram of an α-methylhexylamine base in 100 milliliters of light liquid petrolatum or refined vegetable oil together with an equivalent or slight excess of oleic acid to form the oleate, though concentrations of the active ingredient of but half or twice this may be desirably uesful. Such concentrations represent a range of from about 0.05 to 0.2 gram-equivalent per liter of the salt.

The topical application of a milliliter or at most two or three milliliters of these medicinal preparations containing from 0.01 to 0.3 gram-equivalent per liter of a salt of an α-methylhexylamine suffices to produce a fully effective local vasoconstriction. No notable circulatory or central nervous system stimulant effects will result from the application of such dosages to the mucosa. Observations with regard to the systemic effects of α-methyl-normal-hexylamine and α-methyl-iso-hexylamine have shown that following the complete absorption of as much as 100 milligrams of the sulfates of these amines (corresponding to 0.6 milligram-equivalent) there may be a just detectable rise in blood pressure. Following absorption of 200 milligrams of these salts there results a moderate increase in blood pressure and reflex slowing of the heart rate. No central nervous system effects are to be noted after any such dosages of these compounds. Systemic absorption of such dosages from local applications to the mucosa of the nose or eye could only occur from solutions of suitable concentration with amounts in excess of those required for the production of a full local vasoconstriction effect and even then the resultant circulatory actions represent no considerable hazard.

The effective ingredient of the medical preparation may be prepared by known procedures. Thus for example, α-methyl-normal-hexylamine base may be prepared by the catalytic reduction of methyl amyl ketoxime with hydrogen or by reduction with metallic sodium in ethanol or butanol, and similarly methyl isoamyl ketoxime may be reduced to form α-methyl-iso-hexylamine base. The α-methyl-normal-hexylamine base when pure boils about 141–142° C. and the α-methyl-iso-hexylamine base boils about 137° C. These bases may be put directly into solution in water or other suitable solvent and then made into neutral or slightly acidic solution of a salt by addition of an equivalent of an acid such as hydrochloric, sulfuric, tartaric or oleic. These bases form hygroscopic chlorides which are somewhat difficult to handle as solids, but form air stable sulfates which melt only above about 250–260° with decomposition. The sulfates are particularly desirable for use in medical preparations because of their ease of crystallization from suitable solvents such as water-ethanol mixtures. Bitartrates of these α-methylhexylamines have been found to be readily formed and crystallize well. The racemic amines may be resolved into their optically active forms by crystallizing their d-tartaric and l-tartaric acid salts from ethanol and then liberating the optically active amines or these salts may be directly used for the making of suitable medical preparations. The oleates of the α-methylhexylamines are best made in connection with the compounding of their solutions suitable for medical preparations.

I claim:

1. A vasoconstrictor composition comprising a salt of an α-methylhexylamine of the group consisting of α-methyl-normal-hexylamine and α-methyl-iso-hexylamine dissolved in a many-fold greater amount of a bland vehicle compatible with the mucous membrane.

2. A vasoconstrictor composition as set forth in claim 1, in which the bland vehicle is an aqueous solution of a substance having therapeutic properties.

3. A vasoconstrictor composition, comprising a salt of α-methyl-normal-hexylamine dissolved in a many-fold greater amount of a bland vehicle compatible with the mucous membrane 4. A vasoconstrictor composition as set forth in claim 3, in which the bland vehicle is an aqueous solution of a substance having therapeutic properties.

5. A vasoconstrictor composition as set forth in claim 3, in which the salt of α-methyl-normal-hexylamine is α-methyl-normal-hexylamine sulfate.

6. A vasoconstrictor composition comprising a bland aqueous solution compatible with the mucous membrane, containing α-methyl-normal-hexylamine sulfate dissolved in a many-fold greater amount of the aqueous solvent.

7. A vasoconstrictor composition comprising a bland aqueous solution compatible with the mucous membrane, containing about one to two per cent of α-methyl-normal-hexylamine sulfate.

8. A vasoconstrictor composition comprising a salt of α-methyl-iso-hexylamine dissolved in a many-fold greater amount of a bland vehicle compatible with the mucous membrane.

9. A vasoconstrictor composition as set forth in claim 8, in which the bland vehicle is an aqueous solution of a substance having therapeutic properties.

10. A vasoconstrictor composition as set forth in claim 8, in which the salt of α-methyl-iso-hexylamine is α-methyl-iso-hexylamine sulfate.

11. A vasoconstrictor composition comprising a bland aqueous solution compatible with the mucous membrane, containing α-methyl-iso-hexylamine sulfate dissolved in a many-fold greater amount of the aqueous solvent.

12. A vasoconstrictor composition comprising a bland aqueous solution compatible with the mucous membrane, containing about one to two percent of α-methyl-iso-hexylamine sulfate.

GORDON A. ALLES.

(References on following page)

REFERENCES CITED

The following references are of record in the file of this patent:

UNITED STATES PATENTS

| Number | Name | Date |
|---|---|---|
| 2,256,434 | Klavehn | Sept. 16, 1941 |
| 2,350,318 | Shonle | May 30, 1944 |

OTHER REFERENCES

Beilstein's Handbuch Organische Chemie, 4th ed., vol. 4, pages 194, 195, 196.

Chemical Abstracts, vol. 15, page 2063.

Dunker et al.: Journ. Amer. Pharm. Assn. (1941), vol. 30, pages 619–623.

Proetz: Annals of Otology, Phinology and Laryng., Mar. 1942, vol. 51, pages 112–116.

Tainter: Arch. Internat. de Pharmcodynamie et de Therapie, (1933), vol. 46, pages 223 to 226.